United States Patent
Yamamoto

(10) Patent No.: US 7,287,889 B2
(45) Date of Patent: Oct. 30, 2007

(54) LAMP APPARATUS FOR VEHICLE

(75) Inventor: Takao Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 71 days.

(21) Appl. No.: 10/781,727

(22) Filed: Feb. 20, 2004

(65) Prior Publication Data

US 2004/0223335 A1  Nov. 11, 2004

(30) Foreign Application Priority Data

| Mar. 6, 2003 | (JP) | ............................. 2003-057966 |
| Mar. 6, 2003 | (JP) | ............................. 2003-059767 |
| Mar. 6, 2003 | (JP) | ............................. 2003-060355 |

(51) Int. Cl.
*F21S 8/10* (2006.01)

(52) U.S. Cl. .................................... 362/545

(58) Field of Classification Search ................. 362/545
See application file for complete search history.

(56) References Cited

U.S. PATENT DOCUMENTS

| 4,597,033 A * | 6/1986 | Meggs et al. ................ 362/545 |
| 5,038,255 A * | 8/1991 | Nishihashi et al. .......... 362/547 |
| 5,856,779 A * | 1/1999 | Friday ......................... 362/800 |
| 6,109,769 A * | 8/2000 | Lakosky ..................... 362/545 |
| 6,158,882 A * | 12/2000 | Bischoff, Jr. ................ 362/545 |
| 6,161,910 A | 12/2000 | Reisenauer et al. |
| 6,268,702 B1 | 7/2001 | Fleck |
| 6,648,495 B1 * | 11/2003 | Hsu ............................ 362/547 |
| 6,715,909 B2 * | 4/2004 | Serizawa ..................... 362/545 |
| 2002/0181241 A1 | 12/2002 | Tietze |
| 2003/0031028 A1 | 2/2003 | Murray et al. |

FOREIGN PATENT DOCUMENTS

| DE | 101 37 338 A1 | 2/2000 |
| EP | 1 178 706 A3 | 2/2002 |

OTHER PUBLICATIONS (http://electronics.howstuffworks.com/relay1.htm).*
European Office (EPO) Action dated Dec. 9, 2005; 6 pgs.

* cited by examiner

*Primary Examiner*—Sandra O'Shea
*Assistant Examiner*—William J Carter
(74) *Attorney, Agent, or Firm*—Birch, Stewart, Kolasch & Birch, LLP

(57) ABSTRACT

A lamp or blinker apparatus for a vehicle for saving power and providing a long life and for achieving miniaturization of a lamp body by using a light emitting diode as a light source. The lamp or blinker apparatus for a vehicle includes a front blinker having a light emitting diode as a light source in a lamp body, and a resistance circuit for adjusting the voltage to be applied to the light emitting diode. The resistance circuit is provided separately outside the lamp body. The lamp body case may be formed from a heat transfer member with the light emitting diode attached to the lamp body case.

5 Claims, 13 Drawing Sheets

LAMP APPARATUS FOR VEHICLE

CROSS-REFERENCE TO RELATED APPLICATIONS

The present application claims priority under 35 USC 119 to Japanese Patent Application Nos. 2003-060355, 2003-059766 and 2003-059767 all filed on Mar. 6, 2003 the entire contents thereof are hereby incorporated by reference.

BACKGROUND OF THE INVENTION

1. Field of the Invention

This invention relates to a lamp apparatus and a blinker for a vehicle wherein a light emitting diode is used.

2. Description of Background Art

In recent years, vehicle lamps that use a light emitting diode as a light source are increasing. A lamp apparatus of the type mentioned uses a plurality of light emitting diodes in one lamp unit in order to secure a sufficient amount of light. Since the light emitting diodes are low in power consumption and have a long life they provide a high degree of freedom in the shaping of a lamp body. The lamp apparatus and blinker of the type described is suitable particularly for an vehicle that is limited in the space available for a lamp body like a door mirror of the type which has a blinker built therein or a motorcycle.

In recent years, a blinker apparatus for a vehicle wherein a light emitting diode is used as a light source is available. A blinker apparatus of the type mentioned uses a plurality of light emitting diodes in one blinker in order to secure a sufficient amount of light.

To the blinker, power from a vehicle power supply is supplied through a blinker relay apparatus. See, for example, Japanese Utility-Model Laid-Open No. Sho 57-5227.

Since a forward voltage necessary to turn on the light emitting diodes is sufficiently low when compared with a vehicle power supply voltage, the vehicle power supply voltage is usually dropped by means of a series of resistors provided for each light emitting diode to adjust the voltage to be applied to the light emitting diode. See, for example, Japanese Patent Laid-open No. Sho 63-222984.

However, in the conventional lamp apparatus for a vehicle described above, the temperature of the light emitting diodes is liable to be raised by heat generated by the series resistors. In addition, in the blinker apparatus for a vehicle described above, since the series resistors are provided in the proximity of the corresponding light emitting diodes in order to suppress an error in the voltage to be applied, upon energization, the temperature of the light emitting diodes is raised by heat generated by the series resistors.

As the temperature of the light emitting diodes becomes high, the forward voltage drops. As a result, increased forward current flows to the light emitting diodes to increase the power dissipation and reduce the life of operation of the light emitting diodes. Further, if the distance between the parts is increased to raise the heat radiation property, then the lamp body is increased in size. An increase in size is difficult when the arrangement space for the lamp body is limited.

As a means for solving the subject described above, a lamp apparatus for a vehicle is provided wherein a light emitting diode is used as a light source and wherein a lamp body case is formed from a material having a high heat transfer property with the light emitting diode being attached to a part of the lamp body case.

With the lamp apparatus for a vehicle, heat generated by the light emitting diode and so forth can be transmitted directly to the lamp body case and easily radiated. Consequently, a temperature rise of the light emitting diode is suppressed, and the forward voltage is stabilized and the lighting forward current can be maintained within an appropriate range.

Further, because the heat radiation property is increased, parts can be arranged densely in the lamp body. Consequently, a miniaturization of the lamp body can be anticipated.

SUMMARY OF THE INVENTION

According to the present invention, a lamp apparatus for a vehicle is provided wherein a light emitting diode is used as a light source and wherein the lamp apparatus includes a voltage adjustment means for adjusting a voltage to be applied to the light emitting diode. The voltage adjustment means is attached to a heat radiating member and the light emitting diode is attached to the heat radiating member in a spaced relationship from the voltage adjustment means.

With the lamp apparatus for a vehicle, heat generated by the light emitting diode and the voltage adjustment means can be transmitted directly to the heat radiating member and is easily radiated. At this time, since the light emitting diode and the voltage adjustment means are attached in a spaced relationship with respect to each other, transmission of heat between them can be suppressed. Consequently, a temperature rise of the light emitting diode is suppressed, and the forward voltage is stabilized and the lighting forward current can be maintained within an appropriate range.

SUMMARY AND OBJECTS OF THE INVENTION

The present embodiment provides a lamp apparatus and blinker for a vehicle which saves power and has a long life and can achieve miniaturization of a lamp body using a light emitting diode as a light source.

According to the present invention, a lamp apparatus for a vehicle includes the lamp apparatus with a lamp unit having a light emitting diode as a light source in a lamp body and voltage adjustment means for adjusting a voltage to be applied to the light emitting diode. The voltage adjustment means is provided separately outside the lamp body.

According to the present invention, a blinker apparatus for a vehicle includes a blinker apparatus with a blinker having a light emitting diode as a light source in a lamp body and a voltage adjustment means for adjusting a voltage to be applied to the light emitting diode. The voltage adjustment means is provided in a blinker relay apparatus separately from the lamp body.

According to the lamp apparatus and blinker for a vehicle, since the voltage to be applied to the light emitting diode is adjusted by the voltage adjustment means provided separately outside the lamp body, even if the voltage adjustment means generates heat, the temperature of the light emitting diode in the lamp body is not raised, and the forward voltage can be stabilized to maintain the lighting forward current within an appropriate range.

Further, since the amount of heat generation is small, parts can be disposed densely in the lamp body, for miniaturization of the blinker. In addition, since the voltage adjustment means is provided separately outside the lamp body, the weight of the lamp unit can be reduced.

Further, since the voltage adjustment means is provided in the blinker relay apparatus, it can be formed integrally with the blinker relay apparatus, and the number of parts and the number of man-hours in assembly can be reduced.

According to the present invention, the lamp apparatus for a vehicle includes the voltage adjustment means that is attached to a supporting member on which the lamp unit is supported.

According to the lamp apparatus for a vehicle, the supporting member for supporting the lamp unit and the voltage adjustment means can be formed integrally with each other. Thus, a support for supporting the voltage adjustment means and an assembling operation of the same can be omitted. Further, if the supporting member is made of a material having a high heat transfer property like a metal, then it can be utilized as a heat sink and the heat radiation property for the voltage adjustment means can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, embodiments of the present invention are described with reference to the drawings.

Figure 1:
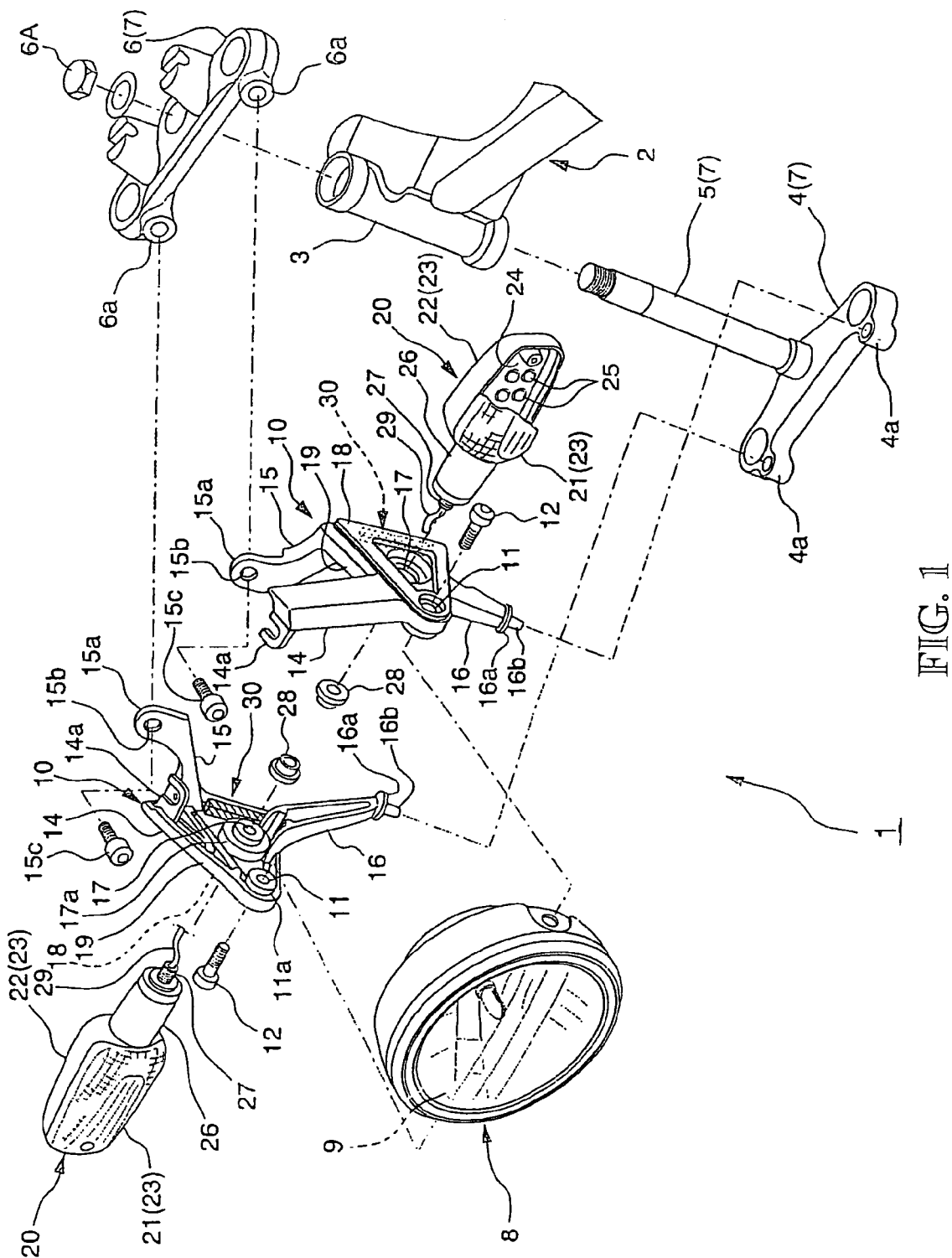
FIG. 1 is an exploded perspective view of a bead pipe of a motorcycle according to an embodiment of the present invention and several members around the head pipe.

Referring to FIG. 1, a motorcycle 1 is provided with a head pipe 3 provided at a front end portion of a vehicle body frame 2. A stem pipe 5 is secured integrally to a bottom bridge 4 and extends through and is mounted for rotation around an axis thereof on the head pipe 3. A top bridge 6 is secured by means of a stem nut 6A to a portion of the stem pipe 5, which projects from the head pipe 3. A steering stem 7 is composed principally of the top bridge 6, stem pipe 5, and bottom bridge 4 and is supported for steering operation on the head pipe 3. It is to be noted that a front fork not shown is fitted in and secured to fitting holes formed at the opposite left and right end portions of the top bridge 6 and the bottom bridge 4.

A circular one lamp headlamp 8 is disposed forwardly of the head pipe 3. The headlamp 8 is held in a sandwiched state by a pair of left and right lamp brackets 10, 10 and is attached to the steering stem 7 through the lamp brackets 10.

Insertion holes 11 are provided at front end portions of the lamp brackets 10 and extend along parallel axial lines in leftward and rightward directions. Fastening bolts 12 are inserted in the insertion holes 11 and are tightened to left and right outer side fastening nut holes 9 of the headlamp 8 to secure the headlamp 8 and the lamp brackets 10 integrally to each other. It is to be noted that, if the fastening bolts 12 are loosened, then the headlamp 8 is permitted to tiltably move upwardly and downwardly thereby to allow adjustment of the optical axis of the headlamp 8 in the upward and downward directions.

Figure 2:
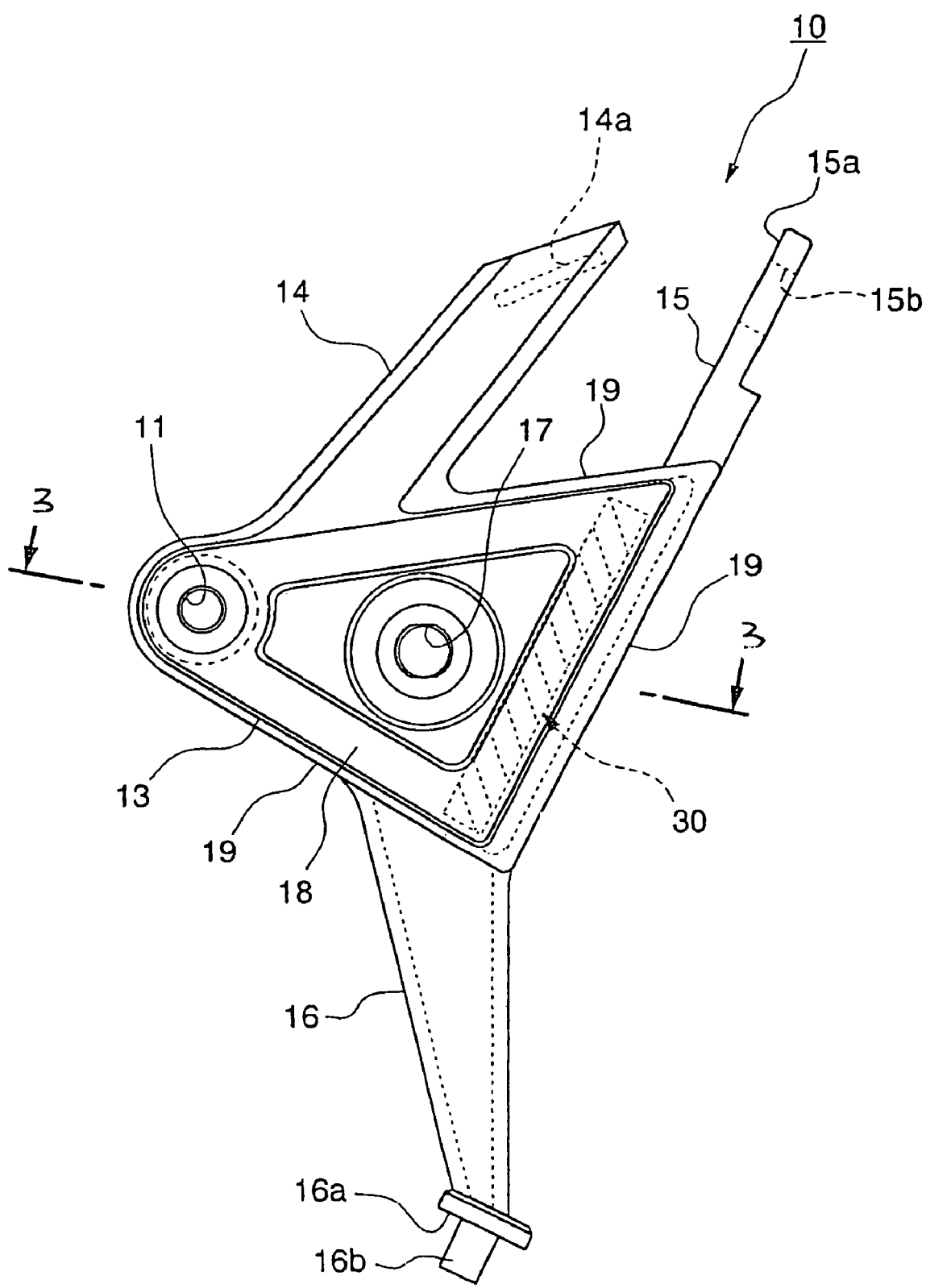
FIG. 2 is a side elevational view of a lamp bracket.

Referring now to FIG. 2, each of the lamp brackets 10 is formed as an aluminum die-cast article with an attaching arm 14 extending upwardly, rearwardly and inwardly in a vehicle widthwise direction from the front side of an upper portion of a body 13 of a substantially triangular shape while a connecting stay 15 extends upwardly, rearwardly and inwardly in the vehicle widthwise direction from the rear side of an upper portion of the body 13. Further, a supporting arm 16 extends downwardly and inwardly in the vehicle widthwise direction from the rear side of a lower portion of the body 13. The insertion hole 11 for supporting the headlamp 8 is formed at a front portion of the body 13, and an insertion hole 17 for attaching a front blinker 20 is formed at a substantially central portion of the body 13.

A connecting seat face 15a and a connecting hole 15b are formed at an upper end portion of each of the connecting stays 15. Boss portions 6a, 6a corresponding to the connecting seat faces 15a and the connecting holes 15b are provided on a front face of the top bridge 6. Connecting bolts 15c are inserted into the connecting holes 15b from the front and are tightened into the corresponding boss portions 6a to secure upper portions of the lamp brackets 10 to the top bridge 6. Meanwhile, a receiving seat face 16a and a projecting shaft 16b are provided at a lower end of each of the supporting arms 16. The receiving seat face 16a is formed substantially in parallel to an upper face of the bottom bridge 4 with the projecting shaft 16b projecting downwardly from the receiving seat face 16a. Boss portions 4a, 4a corresponding to the receiving seat faces 16a and the projecting shafts 16b are provided on the opposite sides of a front portion of the bottom bridge 4. Each of the lamp brackets 10 is supported on the bottom bridge 4 from below such that the projecting shaft 16b is fitted in the corresponding boss portion 4a and the receiving seat face 16a contacts with an upper face of the boss portion 4a. The lamp brackets 10 are attached to the steering stem 7 in this manner. It is to be noted that an attaching seat face 14a is provided in a rather forwardly inclined state at an upper end portion of each of the attaching arms 14, and a meter unit not shown is attached to the attaching seat faces 14a.

The insertion holes 11 and 17 of each of the lamp brackets 10 are formed at a bottom portion of a seat face portion formed in a recess state in the widthwise direction on the outer side face of the body 13. Here, the inner side of the body 13 of each of the lamp brackets 10 in the vehicle widthwise direction is recessed by removing material to provide an outer side wall 18, an outer peripheral wall 19 of the outer side wall 18, cylindrical walls 11a and 17a, which form the seat face portions described hereinabove, and so forth. It is to be noted that also the inner sides of the supporting arms 16 and the attaching arms 14 in the vehicle widthwise direction are recessed similarly by removing material.

Each of the front blinkers 20 includes a lamp body 23 formed from a lens 21 and a lamp body case 22 and has, in the lamp body 23, a plurality of light emitting diodes (LEDs) 25 mounted on a board 24 and serving as a light source. A connecting shaft portion 26 is provided on the inner side of the lamp body 23 in the vehicle widthwise direction, and a threaded portion 27 projects from a tip end of the connecting shaft portion 26. The threaded portion 27 is inserted in the insertion hole 17 of the corresponding lamp bracket 10, and a nut 28 is screwed on the threaded portion 27 from the inner side of the lamp bracket 10 to integrally secure the front blinker 20 to the lamp bracket 10. It is to be noted that the threaded portion 27 is hollow and serves as an outlet port of a harness 29 connected to the light emitting diodes 25.

A space is formed by removing material from a rear portion of each of the lamp brackets 10, and a resistance circuit (voltage adjustment means) 30 for adjusting the voltage to be applied to the light emitting diodes 25 of the front blinker 20 on the same side is attached in the space.

Figure 3:
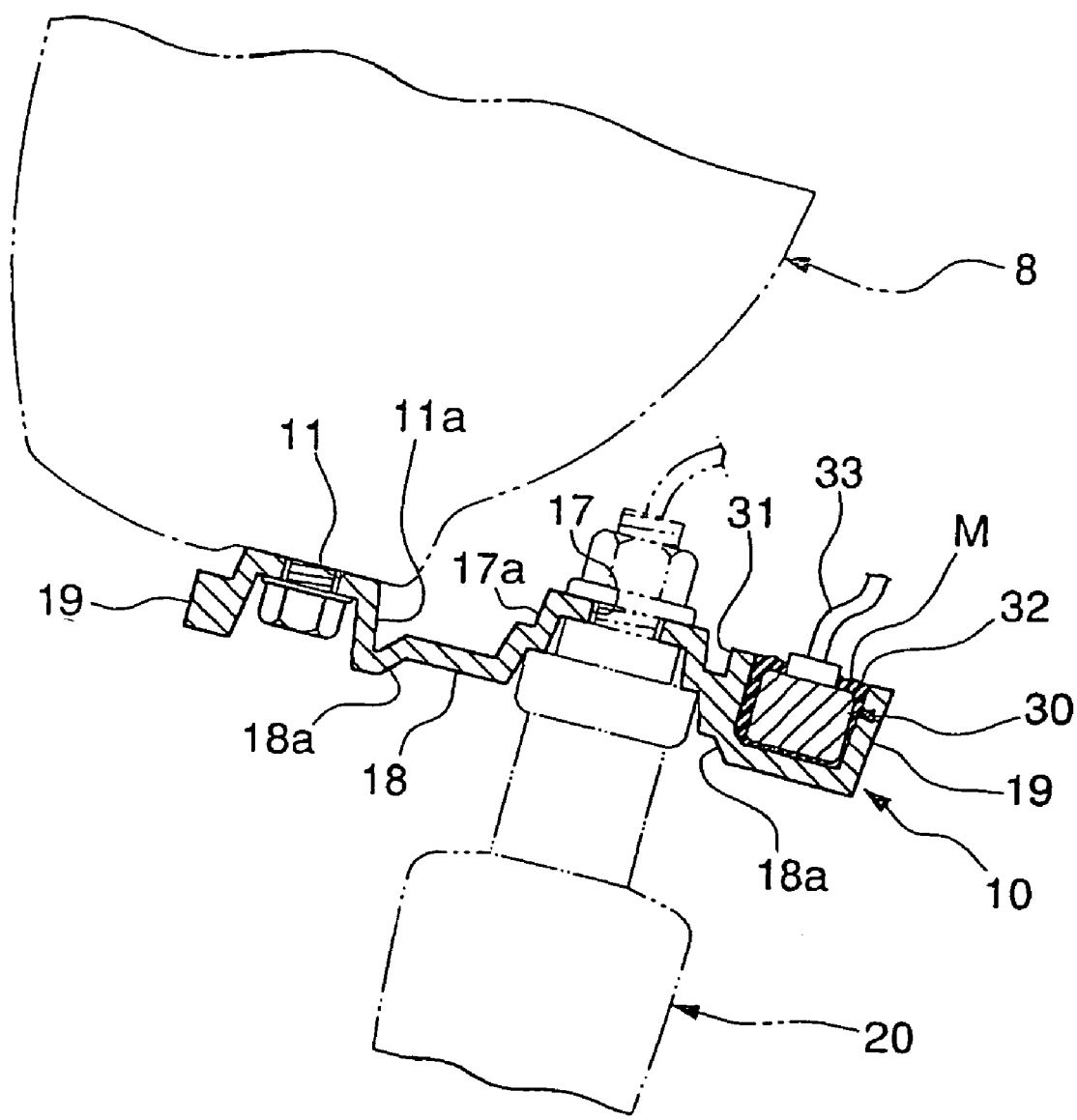
FIG. 3 is a sectional view taken along line 3-3 of FIG. 2.

Referring also to FIG. 3, a vertical wall 31 is provided at a location of the lamp bracket 10 spaced by a predetermined distance forwardly from the rear side outer peripheral wall 19 of the lamp bracket 10 and projects inwardly in the vehicle widthwise direction from the outer side wall 18. The range surrounded by the vertical wall 31 and the outer peripheral wall 19 serves as an accommodation portion 32 for the resistance circuit 30. Here, since the resistance circuit 30 is small in size when compared with the lamp bracket 10, the accommodation portion 32 assumes only a range of a substantially rectangular shape extending along the inner side of the rear side outer peripheral wall 19. Thus, by accommodating the resistance circuit 30 into the accommodation portion 32 and then sealing the accommodation portion 32 with a mold resin M or the like, for example, of the urethane type, the lamp bracket 10 and the resistance circuit 30 are integrated with each other. In this state, the resistance circuit 30 is positioned in the proximity of the outer side wall 18 of the lamp bracket 10. Further, a harness 33 extending from the resistance circuit 30 and the harness 29 of the front blinker 20 are electrically connected to each other. A stepped portion 18a is formed on the outer side wall 18 of the lamp bracket 10 so as to reinforce the outer side wall 18 and provide an accent with respect to the appearance. A part of the outer side wall 18 is displaced to the inner side in the vehicle in the widthwise direction through the stepped portion 18a. It is to be noted that FIGS. 2 and 3 show the lamp bracket 10 and the resistance circuit 30 on the left side, and those on the right side are symmetrical with respect to the leftward and rightward directions.

According to the embodiment described above, a pair of left and right front blinkers 20, 20, each of which includes a plurality of light emitting diodes 25 as a light source, are supported on a pair of left and right lamp brackets 10, 10. In an accommodation portion 32 of each of the lamp brackets 10, a resistance circuit 30 is provided that corresponds to the front blinker 20 on the same side. Consequently, the light emitting diodes 25 and the resistance circuit 30 of the front blinker 20 are provided spatially separately from each other. Therefore, a temperature rise of the light emitting diodes 25 caused by heat generation by the resistance circuit 30 is suppressed, and the forward voltage is stabilized and the lighting forward current can be maintained within an appropriate range. Further, the light emitting diodes 25 can save power and have a long life.

Further, since each of the lamp brackets 10 is an aluminum die-cast article and is recessed by removal of material on the inner side in the vehicle widthwise direction, a significant reduction in the weight can be anticipated and the internal space of the lamp bracket 10 can be utilized effectively as the accommodation portion 32 for the resistance circuit 30. In addition, since the resistance circuit 30 is small in size when compared with the lamp bracket 10 and the accommodation portion 32 can be assured without an increase in the scale of the lamp bracket 10, the degree of freedom in the design of the lamp bracket 10 is not at all deteriorated. Further, the lamp bracket 10 can be utilized also as a heat sink of the resistance circuit 30 and can favorably radiate heat generated by the resistance circuit 30 positioned in the proximity of the outer side wall 18 of the lamp bracket 10.

Furthermore, since the lamp bracket 10 and the resistance circuit 30 are formed integrally with each other, a part or an operation for attaching the resistance circuit 30 to the vehicle body is not required. Consequently, a reduction in the cost can be anticipated. Further, since the resistance circuit 30 is accommodated inside of the lamp bracket 10, it does not degrade the appearance and is advantageous in terms of the appearance. In addition, this structure is preferable particularly with respect to a vehicle as the motorcycle 1 wherein a peripheral portion of the lamp bracket 10 is exposed to the outside.

Further, since the resistance circuit 30 is provided separately outside the lamp body 23, the amount of heat generation within the lamp body 23 is decreased, and the parts can be disposed densely. Therefore, miniaturization of the front blinker 20 can be anticipated and the degree of freedom in design can be increased. It is to be noted that, where the stepped portion 18a formed on the outer side wall 18 of the lamp bracket 10 and the vertical wall 31 conform to each other, a molding sink on the outer side face of the lamp bracket 10 arising from the formation of the vertical wall 31 can be prevented.

Figure 4:
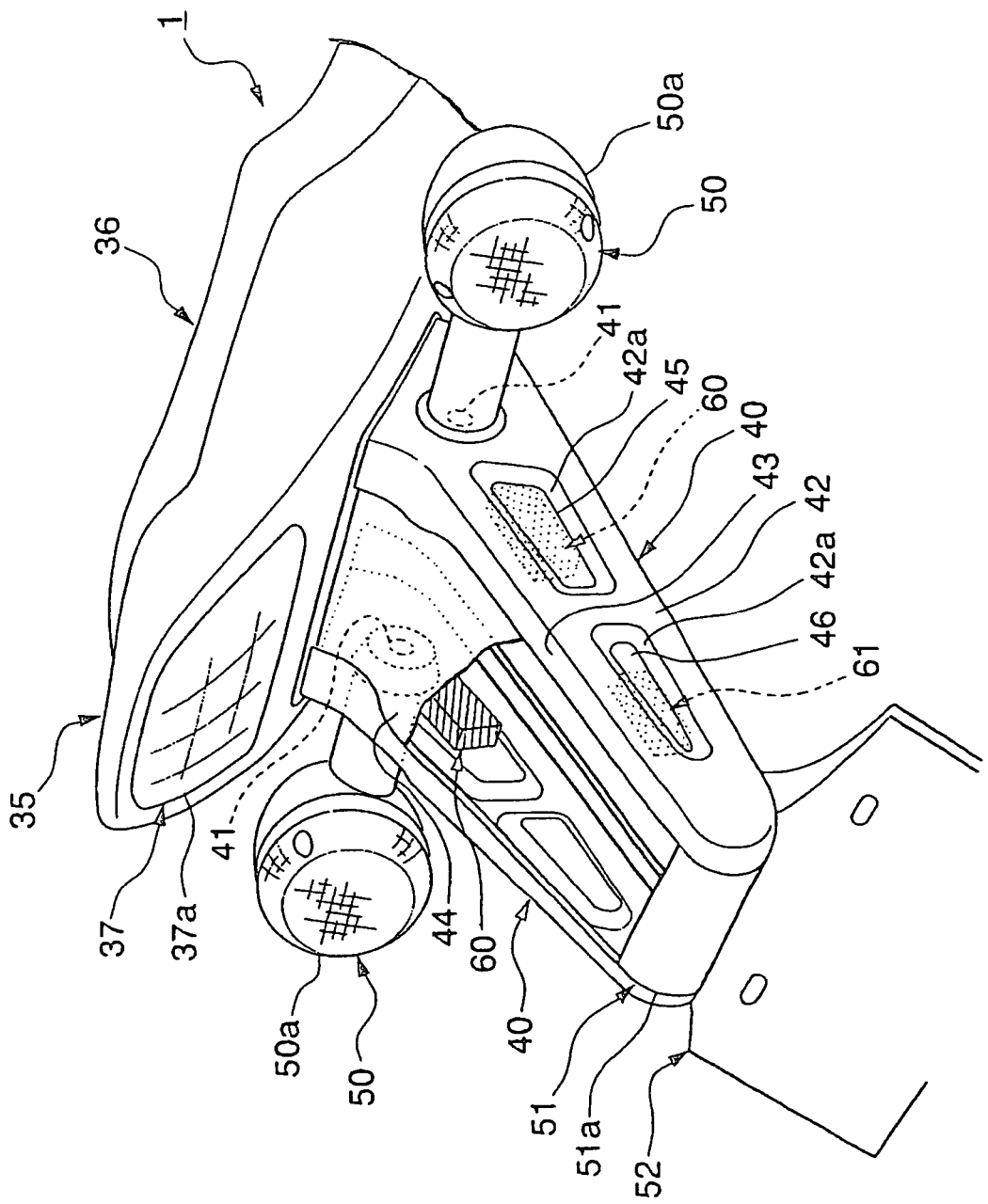
FIG. 4 is a perspective view of members around a rear cowl of the motorcycle.
Figure 5:
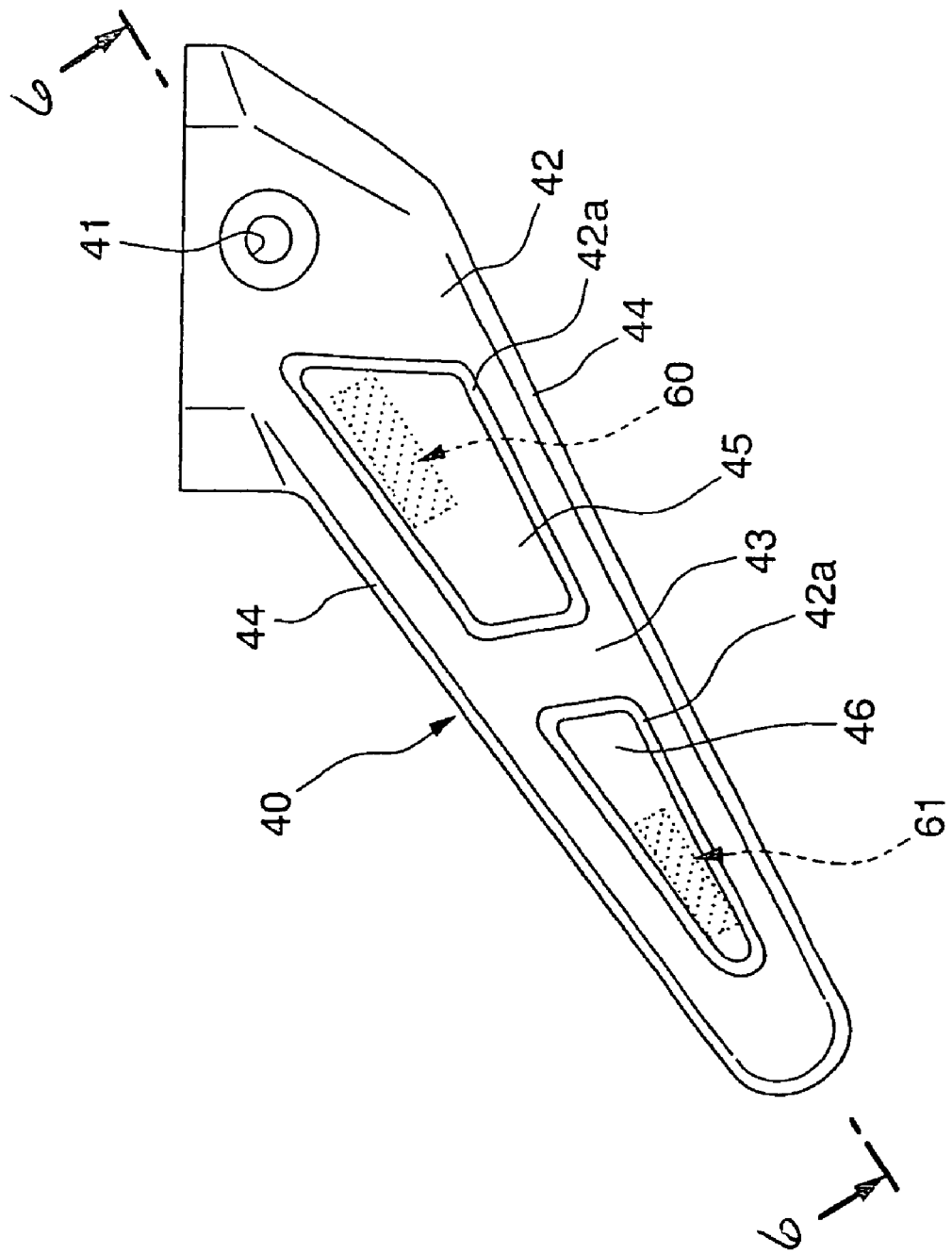
FIG. 5 is a side elevational view of a license bracket.
Figure 6:
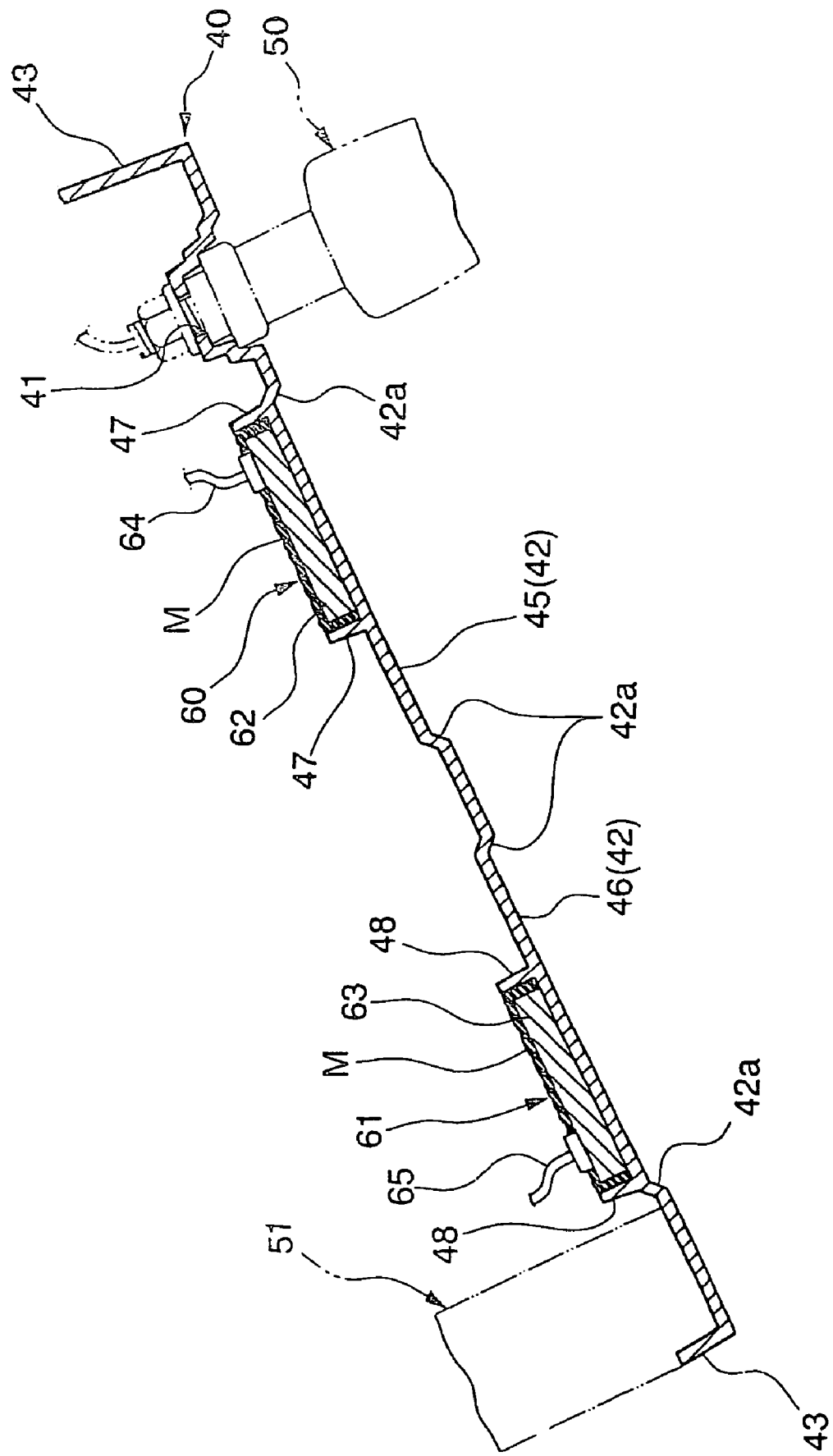
FIG. 6 is a sectional view taken along line 6-6 of FIG. 5.

Now, an example wherein the present invention is applied to a rear portion of a vehicle body of the motorcycle 1 is described as a second embodiment with reference to FIGS. 4 to 6.

Referring to FIG. 4, a rear cowl 35 of the motorcycle 1 and the outer periphery of the seat rail (not shown) are connected to a rear portion of the vehicle body frame 2 which is covered with the rear cowl 35. A seat 36 is disposed at an upper portion of the rear cowl 35, and a tail lamp 37 is provided at a rear end of the rear cowl 35. Further, a pair of left and right license brackets 40, 40 are provided at a lower portion of the rear cowl 35 and extend downwardly and rearwardly.

Referring to FIG. 5, each of the license brackets 40 is formed from an aluminum die-cast material such that it is elongated in its extension direction and tapers as viewed in a side elevation. The license brackets 40 are disposed in a spaced relationship from each other in the leftward and rightward directions, and upper end portions of the brackets 40 extend through a lower portion of the rear cowl 35 and are secured to the seat rail. A rear blinker 50 is attached to an upper portion of each of the license brackets 40 using an insertion hole 41 while a license lamp 51 is attached at a lower end portion of each of the license brackets 40 such that it is sandwiched from the left and the right. It is to be noted that a license plate holder 52 is disposed at an illumination position of the license lamp 51. The tail lamp 37, left and right rear blinkers 50, and license lamp 51 are formed as a lamp unit for a vehicle wherein light emitting diodes are provided as a light source in each of lamp bodies 37a, 50a, and 51a.

The inner side of each of the license brackets 40 in the vehicle widthwise direction is recessed by removing material leaving an outer side wall 42, an outer peripheral wall 43 of the outer side wall 42, and so forth. It is to be noted that a cover 44 is attached between the rear side outer peripheral walls 43. Further, in the space formed as the recess of each of the license brackets 40, a resistance circuit 60 is attached for adjusting the voltage to be applied to the light emitting diodes of the rear blinker 50 on the same side. Further, a resistance circuit 61 for the license lamp 51 is attached in the right side license bracket 40.

Referring also to FIG. 6, a stepped portion 42a is formed on the outer side wall 42 of the license bracket 40 to provide two displaced portions 45 and 46 at which part of the outer side wall 42 varies to the inner side in the vehicle widthwise direction through the stepped portion 42a. The displaced portions 45 and 46 are disposed in a juxtaposed relationship in the longitudinal direction of the license bracket 40, and a vertical wall 47 is provided at a bottom portion of the upper side displaced portion 45 such that it projects inwardly in the vehicle widthwise direction. The range surrounded by the vertical wall 47 serves as an accommodation portion 62 for the resistance circuit 60. Further, only on the left side license bracket 40, a vertical wall 48 is provided at a bottom portion of the lower side displaced portion 46 such that it similarly projects inwardly in the vehicle widthwise direction. The range surrounded by the vertical wall 48 serves as an accommodation portion 63 for accommodating the resistance circuit 61 for the license lamp 51.

The resistance circuits 60 and 61 have a size sufficiently smaller than the license brackets 40. Further, after the resistance circuits 60 and 61 are accommodated into the corresponding accommodation portions 62 and 63, respectively, the accommodation portions 62 and 63 are sealed with the mold resin M described hereinabove or the like to form the license brackets 40 and the resistance circuits 60 and 61 are integrally with each other. In this state, the resistance circuits 60 and 61 are positioned in the proximity of the outer side wall 42 of the license bracket 40. Further, a harness 64 extending from the resistance circuit 60 is electrically connected to the rear blinker 50 while another harness 65 extending from the resistance circuit 61 is electrically connected to the license lamp 51. It is to be noted that FIGS. 5 and 6 show the license bracket 40 and the resistance circuits 60 and 61 on the right side, and those on the left side are symmetrical to them in the leftward and rightward direction except that the resistance circuit 61 and the accommodation portion 63 for the resistance circuit 61 are not provided.

According to the embodiment described above, the left and right rear blinkers 50, 50 and the license lamp 51 wherein light emitting diodes are used as a light source are supported on the pair of left and right license brackets 40, 40, and the resistance circuits 60 for the rear blinkers 50 and the resistance circuit 61 for the license lamp 51 are accommodated in the accommodation portions 62 and 63 of the license brackets 40. Consequently, the light emitting diodes of the lamp units and the resistance circuits 60 and 61 are provided in a spatially spaced relationship from each other. Consequently, a temperature rise of the light emitting diodes caused by heat generation by the resistance circuits 60 and 61 is suppressed to allow the light emitting diodes to save power and have a long life.

Further, since each of the license brackets 40 is formed as aluminum die-cast article they have a significant reduction in weight by removal of material, and the internal spaces thereof are utilized effectively as the accommodation portions 62 and 63 for the resistance circuits 60 and 61. Here, the resistance circuits 60 and 61 are smaller than the license brackets 40 and do not degrade the degree of freedom in design of the license brackets 40. Thus, each of the license brackets 40 serves as a heat sink and can favorably radiate heat generated by the resistance circuits 60 and 61.

Furthermore, since the license brackets 40 and the resistance circuits 60 and 61 are individually formed integrally with each other, the number of parts and the number of man-hours in operation can be reduced to achieve reduction of the cost. Further, since the resistance circuits 60 and 61 are accommodated in the license brackets 40, they do not degrade the appearance.

The parts can be disposed in the lamp body to achieve a miniaturization of each of the lamp units to raise the degree of freedom in design. It is to be noted that it is possible to form the stepped portions 42a of the license brackets 40 and the vertical walls 47 and 48 so as to conform to each other thereby to prevent a molding sink on the outer side face of any of the license brackets 40.

Figure 7:
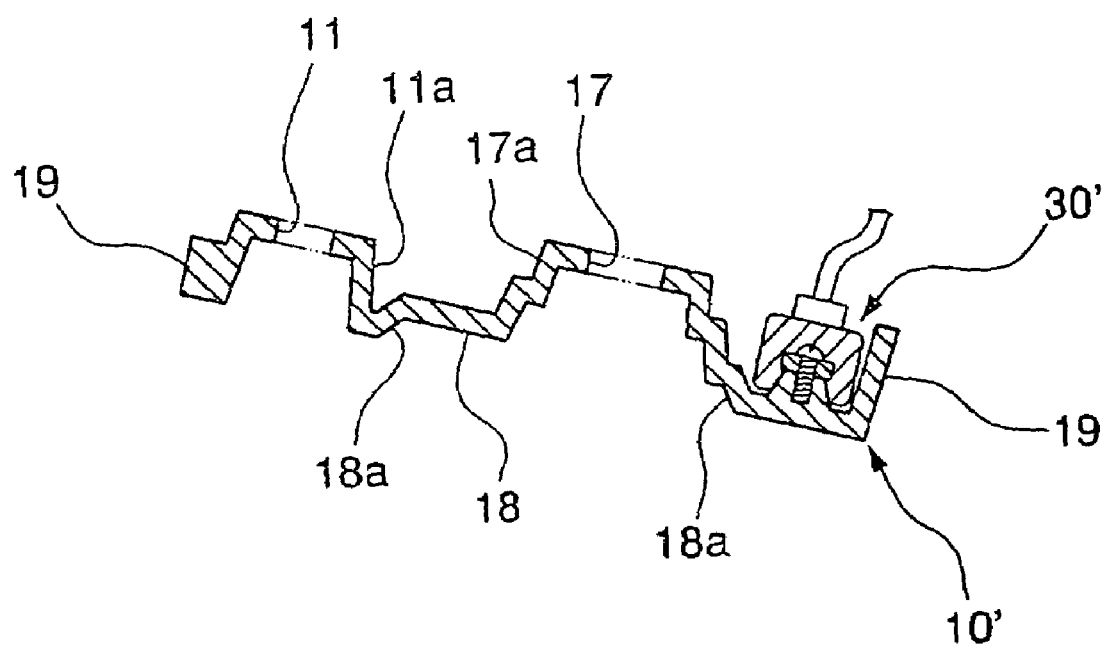
FIG. 7 is a sectional view corresponding to FIG. 3 showing a modification to the embodiment of the present invention.

It is to be noted that the present invention is not limited to the embodiments described above but allows such a configuration that, for example, as shown in FIG. 7, a resistance circuit 30' of a separate member is provided in place of each of the resistance circuits 30 described hereinabove. In addition, a lamp bracket 10' is provided to which the resistance circuit 30' can be secured. Further, the resistance circuit 30' and the lamp bracket 10' are assembled to each other in advance during a separate step. This similarly applies to the resistance circuits 60 and 61 and the license brackets 40. Further, each of the lamp brackets 10 and the license brackets 40 do not need to be aluminum die-cast articles but may be articles formed from a steel plate or formed by presswork.

Also it is possible to accommodate a resistance circuit for the tail lamp 37 in one of the license brackets 40 similarly to the other resistance circuits 60 and 61.

Furthermore, the resistance circuits 30, 60, and 61 may be attached, for example, to the vehicle body frame 2 or the like. Further, any of the resistance circuits may be replaced by a single member in the form of a resistor or an existing regulator as the voltage adjustment means for the light emitting diodes.

Further, the configurations of the embodiments described above are mere examples and can be applied not only to a motorcycle but also to vehicles having three wheels or four wheels and besides can naturally be modified suitably without departing from the spirit and scope of the present invention.

As described above, according to the present invention, since the voltage to be applied to the light emitting diode is adjusted by the voltage adjustment means provided separately outside the lamp body, a temperature rise of the light emitting diodes can be suppressed to allow the light emitting diodes to save power and have a long life.

Further, since parts can be disposed densely in the lamp body, miniaturization of the lamp unit can be anticipated, and since the voltage adjustment means is provided separately outside the lamp body, the weight of the lamp unit can be suppressed to achieve a reduction in weight. Accordingly, the degree of freedom in design of the lamp unit is increased, and the lamp apparatus is suitable particularly where it is demanded to reduce the size and the weight of a lamp unit like a motorcycle or a door mirror of the type, which has a blinker built therein.

According to the present invention, the supporting member for supporting the lamp body and the voltage adjustment means can be formed integrally with each other, and a part for supporting the voltage adjustment means and an assembling operation of the same can be omitted to achieve a reduction in the cost. Further, if the supporting member is made of a metal, then it can be utilized effectively as a heat sink for the voltage adjustment means. Particularly where the material of the supporting member is an aluminum material, then also it is possible to achieve a reduction in weight.

Figure 8:
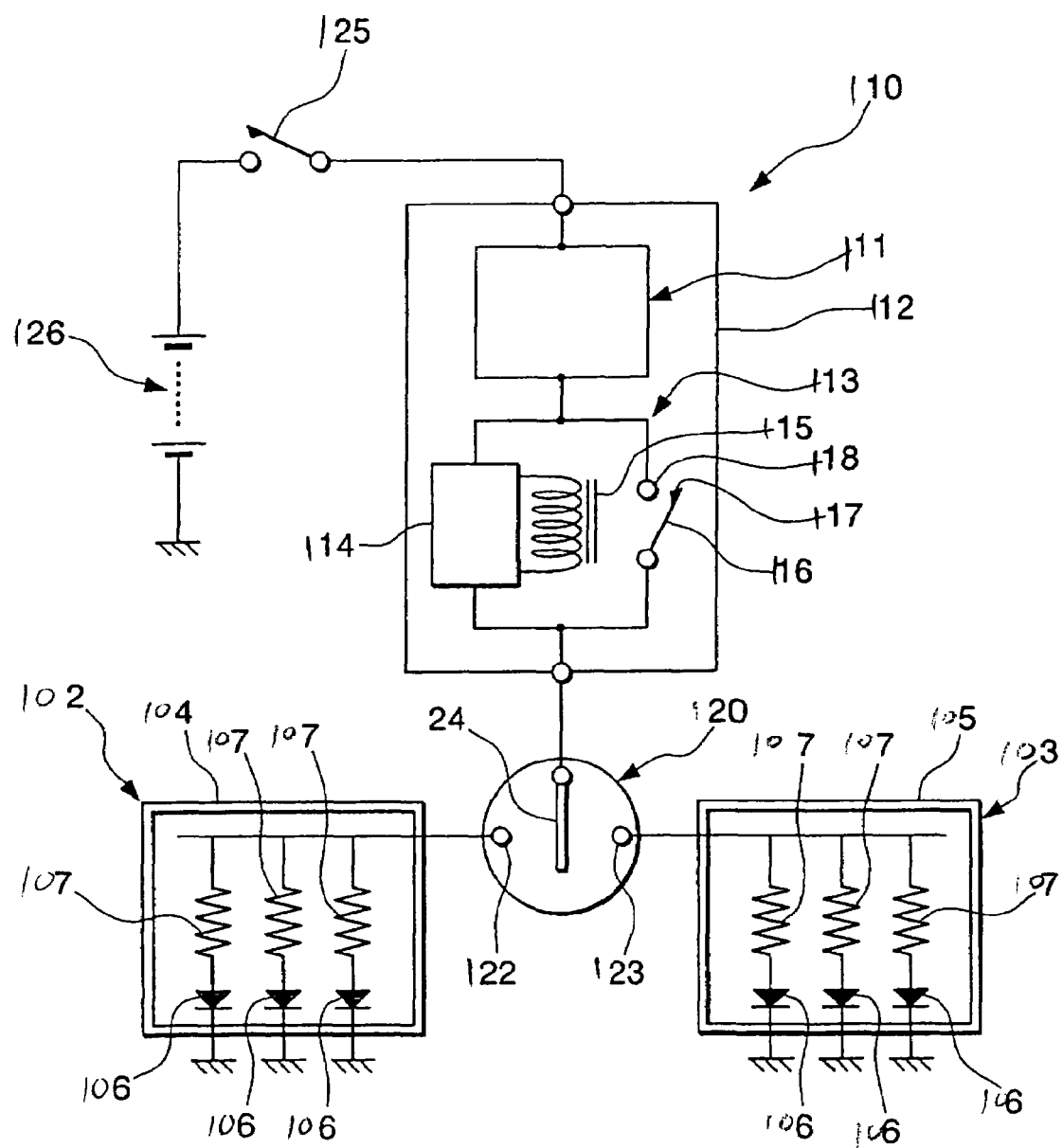
FIG. 8 is a schematic view of a configuration of a blinker apparatus for a vehicle according to an embodiment of the present invention.

As schematically shown in FIG. 8, each of left and right blinkers 102 and 103 in a blinker or lamp apparatus for a vehicle includes a plurality of light emitting diodes (LEDs) 106, 106, . . . as a light source in a lamp body 104 or 105. The turning on/off control for the blinkers 102 and 103 is performed by a blinker relay apparatus 110, and a regulator (voltage adjustment means) 111 for adjusting the voltage to be applied to each of the light emitting diodes 106 that is provided in the blinker relay apparatus 110. The light emitting diodes 106 in each of the lamp bodies 104 and 105 are connected in parallel, and are grounded on one-end side thereof and connected at the other end to left and right contacts 122 and 123 of a blinker switch 120, respectively. A contact piece 124 which operates in response to an operation of the blinker switch 120 is connected to the positive side terminal of a battery apparatus 126, which serves as a vehicle power supply, through the blinker relay apparatus 110 and a key switch 125. If the contact piece 124 is connected to one of the left and right contacts 122 and 123, then the blinkers 102 and 103 are illuminated alternatively.

A protective resistor 107 is connected in series to each of the light emitting diodes 6 so that it further adjusts (drops) the voltage of the battery apparatus 126 adjusted (dropped) by the regulator 111 for each of the light emitting diodes 106 to suppress the lighting forward current within an appropriate range.

The blinker relay apparatus 110 is connected at one end thereof to the positive side terminal of the battery apparatus 126 through the key switch 125 and at the other end thereof to the contact piece 124 of the blinker switch 120. The regulator 111 which may be, for example, an existing three-terminal regulator and a known relay 113 which is a turning on/off apparatus for turning on/off the blinkers 102 and 103 are disposed in order from the battery apparatus 126 side in a case 112 of the blinker relay apparatus 110. An oscillation circuit section 114 of the relay 113 is provided together with a relay coil 115 excited by an output of the oscillation circuit section, and an armature 116 which operates in response to magnetic force of the relay coil. A movable contact 117 is disposed at a tip end of the armature 116 while a fixed contact 118 is disposed at a position opposing to the movable contact 117.

Figure 9:
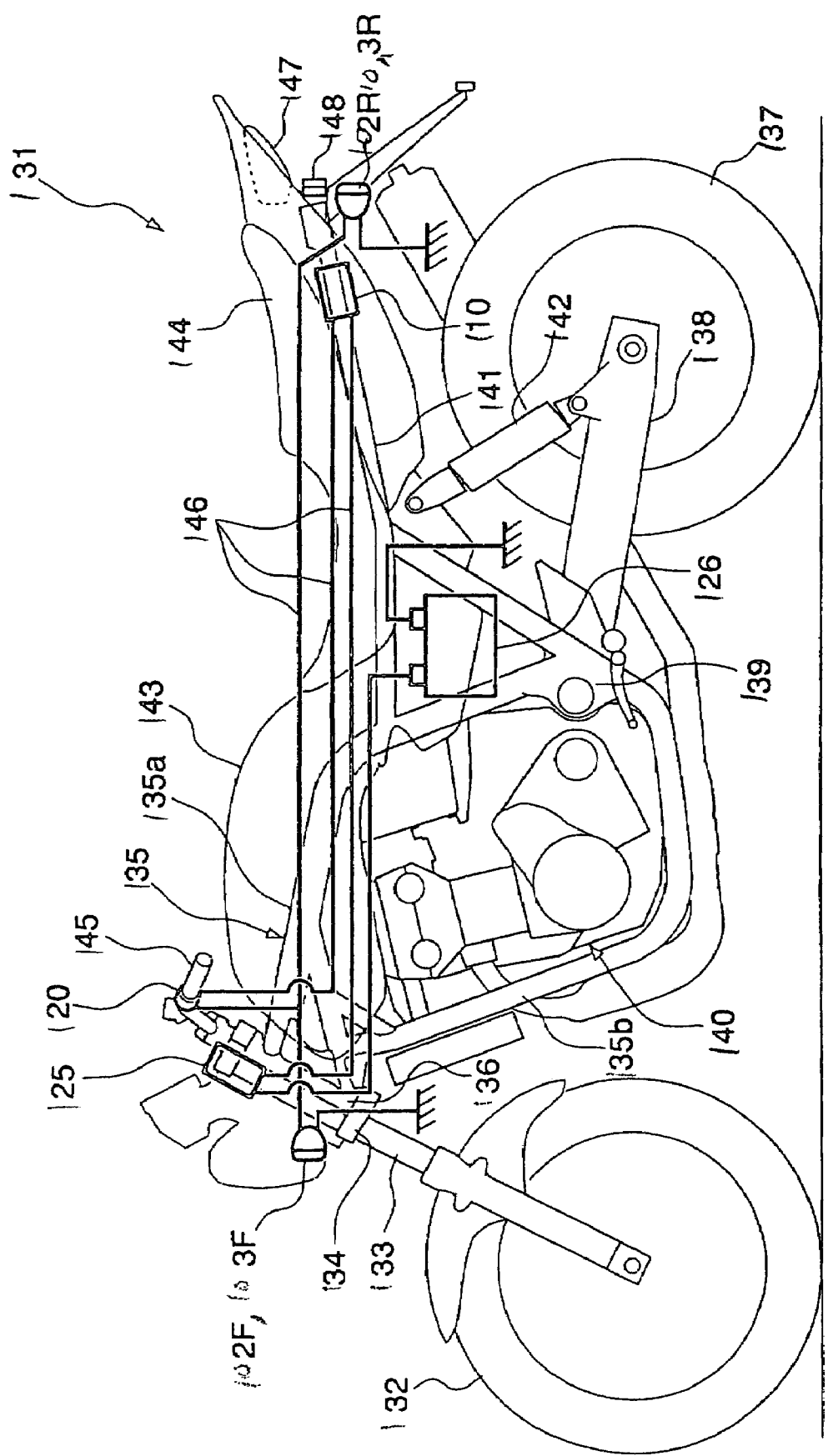
FIG. 9 is a side elevational schematic view showing an example wherein the blinker apparatus for a vehicle of FIG. 1 is applied to a motorcycle.

FIG. 9 shows an example wherein the blinker apparatus for a vehicle described above is applied to a motorcycle 131. A front fork 133 on which a front wheel 132 is rotatably supported is pivotably supported on a head pipe 136 of a vehicle body frame 135 through a steering system 134, and a rear fork 138 on which a rear wheel 137 is rotatably supported is pivotably supported on a pivot portion 139 of the vehicle body frame 135. An engine 140 of the water cooled type is carried at a location surrounded by a main frame 135a and a down tube 135b of the vehicle body frame 135. A seat rail 141 is connected to a rear portion of the main frame 135a. A rear cushion 142 is provided between the seat rail 141 and the rear fork 138. A fuel tank 143 is disposed at an upper portion of the main frame 135a, and a seat 144 is provided at an upper portion of the seat rail 141.

The key switch 125 and a handle bar 145 are mounted on the steering system 134, and the blinker switch 120 is attached to the handle bar 145. Left and right blinkers 102 and 103, which are disposed at a front portion of the vehicle body, are denoted as front blinkers 2F and 3F. Left and right blinkers 102 and 103, which are disposed at a rear portion of the vehicle body, are denoted as rear blinkers 2R and 3R. The front blinkers 2F and 3F are provided forwardly of steering system 134 while the rear blinkers 2R and 3R are provided rearwardly of the seat rail 141. The battery apparatus 126 is carried rearwardly of the engine 140, and the blinker relay apparatus 110 is attached to a side portion of the seat rail 141. The blinkers 2F, 3F, 2R and 3R, key switch 125, blinker switch 120, battery apparatus 126 and blinker relay apparatus 110 are connected to each other in such a state as seen in FIG. 8 by a harness 146. It is to be noted that a tail lamp 147 and a license lamp 148 which are lamp apparatus for a vehicle wherein a light emitting diode is used as a light source similarly to the blinkers 102 and 103 are provided rearwardly of the seat rail 141.

Subsequently, operation of the present embodiment is described.

Figure 10:
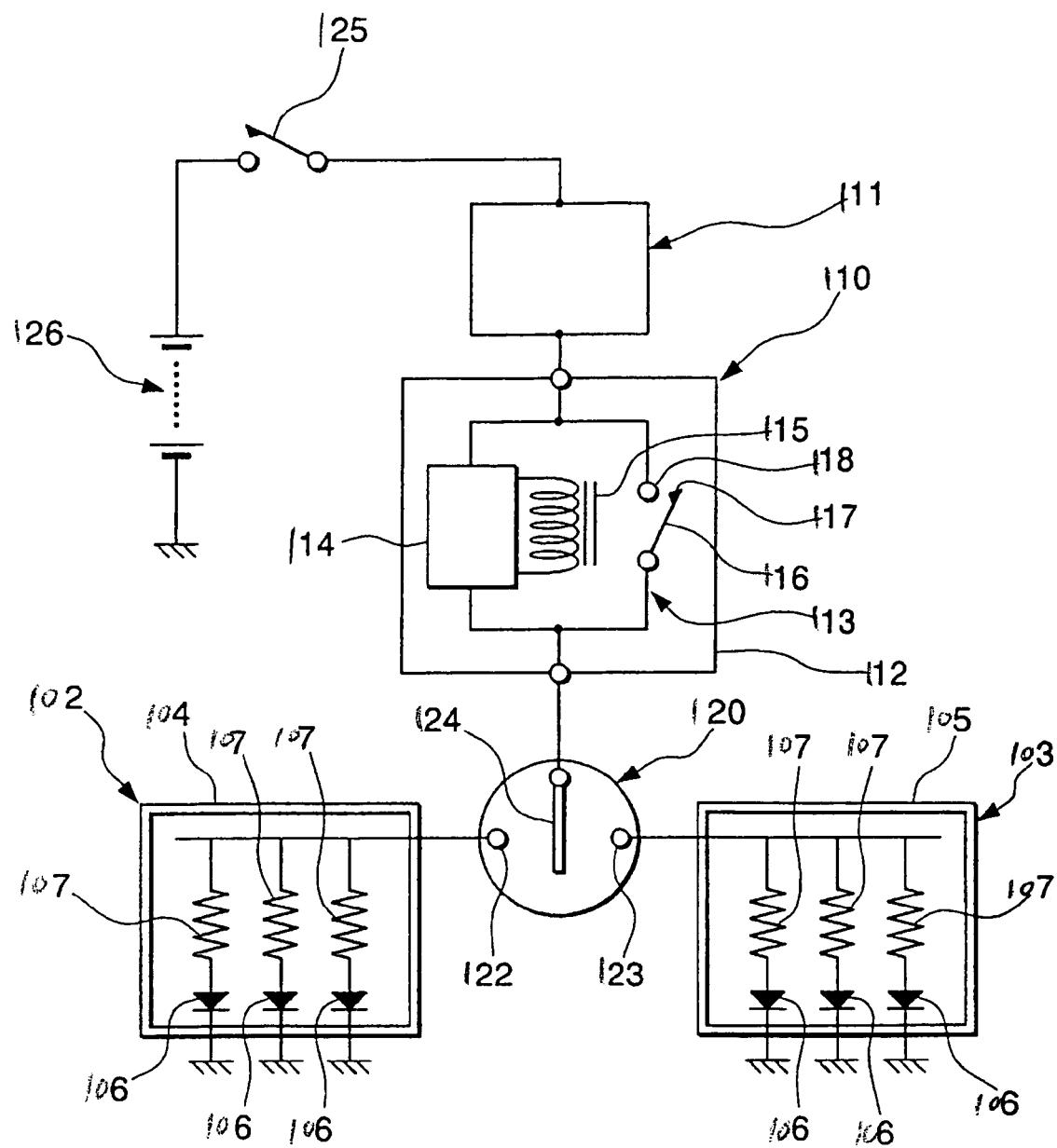
FIG. 10 is a schematic view of a configuration showing another embodiment of the blinker apparatus for a vehicle of FIG. 1.

First, as illustrated in FIG. 10, if the key switch 125 is switched on and the blinker switch 120 is operated to connect the contact piece 124 to the contact 122 or contact 123 side, then the oscillation circuit section 114 of the blinker relay apparatus 110 operates to intermittently excite the relay coil 115, and the armature 116 moves in response to the relay coil 115. In response to the responding movement of the armature 116, the movable contact 117 is brought into contact with the fixed contact 118 to intermittently close the electric circuit so that the blinker on the side to which the blinker switch 120 is operated, for example, the blinker 2F or 2R, is turned on and off.

At this time, power of the battery apparatus 126 is supplied to the blinker 2F or 2R after the voltage thereof is adjusted by the regulator 111, and is further supplied to the light emitting diodes 106 after the voltage is adjusted by the protective resistors 107. Consequently, the resistance values of the protective resistors 107 can be set low, and heat generation of the protective resistors 107 can be suppressed to prevent a temperature rise of the light emitting diodes 106. If the temperature of any of the light emitting diodes 106 rises high, then the forward voltage drops, and thereupon, increased forward current flows. This increases the power consumption of the light emitting diodes 106 and reduces the life of operation of the light emitting diodes 106. However, since the temperature rise of the light emitting diodes 106 is suppressed, the forward current to the light emitting diodes 106 can be maintained within an appropriate range.

Further, since the amount of heat generated by the protective resistors 107 is small, the parts including the light emitting diodes 106 can be disposed densely in each of the lamp bodies 104 and 105. It is to be noted that, since the blinker relay apparatus 10 is attached to the vehicle body frame 135, heat generated by the regulator 11 can be transmitted efficiently to the vehicle body frame 135.

Furthermore, since the regulator 111 is formed integrally with the blinker relay apparatus 110, the number of parts and the number of man-hours in assembly are not increased. In addition, since the regulator 111 is provided separately from the lamp bodies 104 and 105, the weight of the blinkers 2F, 3F, 2R and 3R is not increased.

According to the embodiment described above, since the voltage to be applied to the light emitting diodes 6 is adjusted by the regulator 111 provided separately from the lamp bodies 104 and 105, a temperature rise of the light emitting diodes 106 can be prevented to save the power and assure a long life of the light emitting diodes 106. Further, the parts can be disposed densely in each of the lamp bodies 104 and 105, and consequently, miniaturization of the blinkers 102 and 103 can be anticipated and the degree of freedom in design can be increased. Furthermore, since the blinker relay apparatus 110 is attached to a location at which the thermal conductivity is high such as the vehicle body frame 135, heat generated by the regulator 111 can be easily radiated. Further, since the regulator 111 is formed integrally with the blinker relay apparatus 110, the number of parts and the number of man-hours in assembly can be suppressed to achieve a reduction in the cost. Besides, since the regulator 111 is provided separately, reduction in weight of the blinkers 102 and 103 can be anticipated.

It is to be noted that, as a modification to the embodiment described above, for example, the regulator 111 may be formed as a separate member from the blinker relay apparatus 110 as shown in FIG. 3. In this instance, the degree of freedom in attachment of the blinker relay apparatus 110 and the regulator 111 to the vehicle body frame 135 or the like can be raised. Further, the regulator 111 may be provided on the blinker 102 or 103 side of the blinker relay apparatus 110. Furthermore, a resistance (resistor or resistance circuit) may be used as the voltage adjustment means for the light emitting diodes 106. By the use of a resistance, the parts can be simplified and reduction of the cost can be anticipated when compared with an alternative case wherein a regulator is used. Further, if the resistance is replaced by a constant-current diode, then the blinkers 102 and 103 can be lit stably even on a vehicle where the voltage is liable to vary.

Subsequently, second to sixth embodiments of the present invention are described with reference to FIGS. 11-15 in addition to FIG. 8. It is to be noted that like elements to those of FIG. 8 are denoted by like reference characters and description thereof is omitted.

Figure 11:
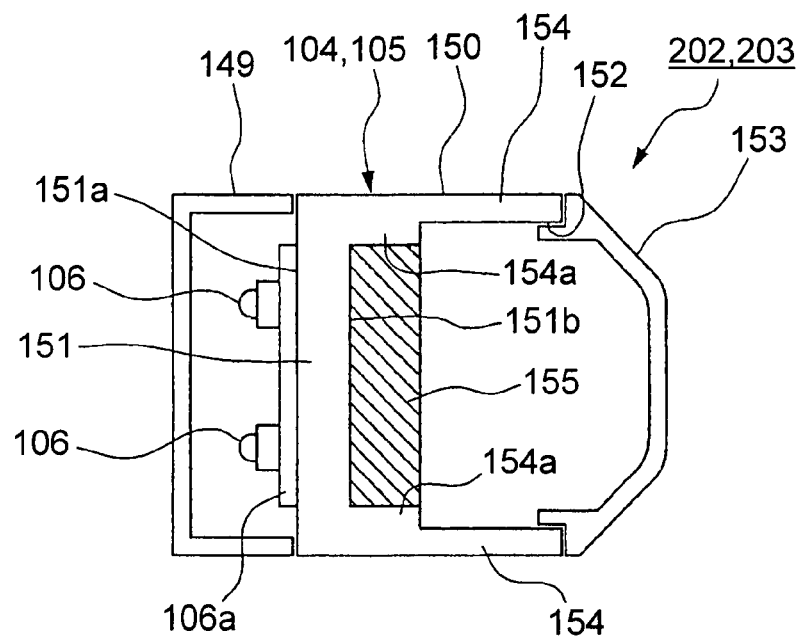
FIG. 11 is a side elevational view showing a configuration of a blinker according to a second embodiment of the present invention.

First, the second embodiment of the present invention uses blinkers 202 and 203 shown in FIG. 11 in place of the blinkers 102 and 103 described hereinabove. The blinkers 102 and 103 include a plurality of light emitting diodes 106, 106, . . . as a light source in the lamp bodies 104 and 105, respectively. The light emitting diodes 106 are mounted on a circuit board 106a and attached to a front portion of a lamp body case 150 which forms part of each of the lamp bodies 104 and 105. Each of the lamp bodies 104 and 105 includes a lens 149 for covering the front and the circumference of the light emitting diodes 6, and the lamp body case (heat radiating member) 150 connected to the rear of the lens 149 and formed in a bottomed tubular shape wherein a portion of the lamp body case 150 to which the light emitting diodes 106 are attached is a bottom wall 151. Each of the lamp bodies 104 and 105 further includes a cover (heat radiating member) 153 serving as part of the lamp body case 150 for closing up a rear opening 152 of the lamp body case 150.

The lens 149 is made of, for example, a translucent resin material. Meanwhile, the lamp body case 150 and the cover 153 are formed from, for example, aluminum die-cast articles so as to assure a high thermal conductivity and a low weight. The light emitting diodes 6 are attached to the lamp body case 150 in a state wherein they closely contact with but are insulated from a front face 151a of the bottom wall 51 through the circuit board 106a. Meanwhile, a resistance circuit (voltage adjustment means) 155 for adjusting the voltage to be applied to each of the light emitting diodes 106 is attached to a rear face 151b side of the bottom wall 151. The resistance circuit 155 is attached to the lamp body case 150 in a state wherein it closely contacts with but is insulated from the rear face 151b of the bottom wall 151. Where the resistance circuit 155 serving as voltage adjustment means is attached to the lamp body case 150 in this manner, the regulator 111 provided in the blinker relay apparatus 110 described hereinabove can be eliminated.

The bottom wall 151 is formed with a greater thickness when compared with a circumferential wall 154 of the lamp body case 150. Therefore, the light emitting diodes 106 are attached to locations spaced from the resistance circuit 155 by a distance corresponding to the thickness of the bottom wall 151. Consequently, each of the blinkers 202 and 203 wherein the light emitting diodes 106 are used as a light source includes the resistance circuit 155 for adjusting the voltage to be applied to the light emitting diodes 106, and the resistance circuit 155 is attached to the lamp body case 150 while the light emitting diodes 106 are provided in a spaced relationship from the resistance circuit 155 on the lamp body case 150. It is to be noted that an increased thickness portion 154a at which the thickness of the circumferential wall 154 is increased toward the inner wall of the lamp body case 150 is formed over the overall circumference of the circumferential wall 154 in the proximity of the boundary to the bottom wall 151. The resistance circuit 155 is in close contact in an insulated state with the inner side of the increased thickness portion 154a.

Now, the operation of the second embodiment is described. When the light emitting diodes 106 are illuminated upon operation of any of the blinkers 202 and 203, the power of the vehicle power supply is supplied to the light emitting diodes 106 after the voltage thereof is adjusted (dropped) by the resistance circuit 155. At this time, heat generated by the light emitting diodes 106 and the resistance circuit 155 is transmitted directly to the lamp body case 150 and radiated well to the outside of the lamp bodies 104 and 105. Further, since the light emitting diodes 106 and the resistance circuit 155 are provided in a spaced relationship from each other across the bottom wall 151 having the increased thickness, heat transmission between the light emitting diodes 106 and the resistance circuit 155 is suppressed. Consequently, the lamp body case 150 is utilized effectively as a heat radiating member for the light emitting diodes 106 and the resistance circuit 155.

According to the second embodiment described above, since the lamp body case 150 of each of the blinkers 202 and 203 wherein the light emitting diodes 106 are used as a light source is formed from a member having a high heat conductivity and the light emitting diodes 106 are attached to part of the lamp body case 150, the lamp body case 150 is utilized effectively as a heat radiating member. Consequently, a temperature rise of the light emitting diodes 106 can be suppressed, and the forward voltage is stabilized and the lighting forward current is maintained within an appropriate range to allow the light emitting diodes 106 to save power and have a long life.

Further, the resistance value of the protective resistor 107 provided for each of the light emitting diodes 106 can be lowered or the protective resistor 107 can be eliminated.

Furthermore, since the heat radiation property is raised, the parts can be disposed densely in each of the lamp bodies 104 and 105. Consequently, miniaturization of the lamp bodies 104 and 105 can be anticipated and the degree of freedom in design can be increased.

In addition, since the resistance circuit 155 is formed integrally, the number of parts and the number of man-hours in assembly can be suppressed to achieve reduction of the cost.

Subsequently, the third embodiment of the present invention is described.

Figure 12:
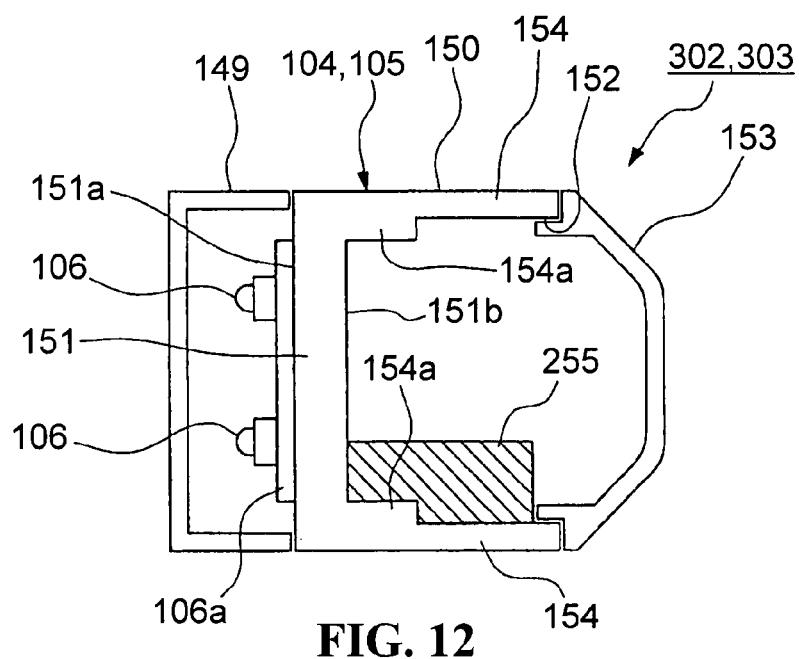
FIG. 12 is a side elevational view of a third embodiment of the present invention corresponding to FIG. 2.

The present embodiment uses blinkers 302 and 303 shown in FIG. 12 in place of the blinkers 202 and 203 described hereinabove. Each of the blinkers 302 and 303 includes a resistance circuit 255 attached to the inner side of the circumferential wall 154 of the lamp body case 150. The resistance circuit 255 is attached, for example, in a state wherein it is in close contact with but is insulated from the inner side of a lower portion of the circumferential wall 154. The light emitting diodes 106 are attached at a location spaced from the resistance circuit 255 of the lamp body case 150.

According to the third embodiment described above, similar operation and effects to those of the second embodiment described above are exhibited. Further, since the light emitting diodes 106 and the resistance circuit 255 are provided in a spaced relationship by a greater distance from each other, heat transmission between them can be further suppressed.

Subsequently, the fourth embodiment of the present invention is described.

Figure 13:
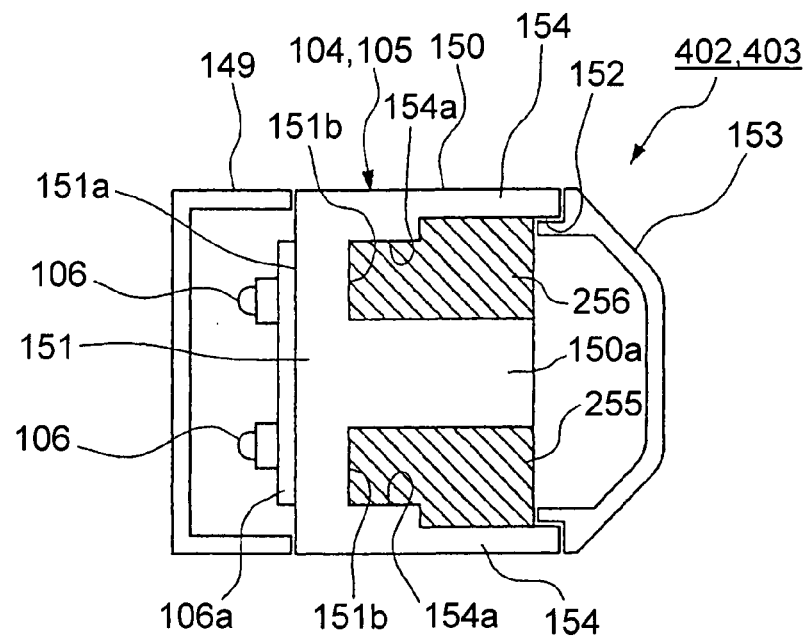
FIG. 13 is a side elevational view of a fourth embodiment of the present invention corresponding to FIG. 2.

The present embodiment uses blinkers 402 and 403 shown in FIG. 13 in place of the blinkers 302 and 303 described hereinabove. In each of the blinkers 402 and 403, the internal space of the lamp body case 150 is partitioned into two parts in which the resistance circuit 255 and an electric circuit 256 are accommodated individually. Here, the electric circuit 256 is, for example, a constant-current circuit and, in the case of a blinker, a relay circuit and so forth for the blinker. The internal space of the lamp body case 150 is divided, for example, in an upward and downward direction by a partition wall 150a, and the resistance circuit 255 and the electric circuit 256 are accommodated individually in the divisional spaces.

According to the fourth embodiment described above, similar operation and effects to those of the third embodiment described hereinabove are exhibited. Further, since the resistance circuit 255 and the electric circuit 256 are accommodated individually in the lamp body case 150, the number of parts and the number of man-hours in assembly can be further suppressed to achieve a reduction in the cost. It is to be noted that it is possible to omit the partition wall 150a.

Subsequently, the fifth embodiment of the present invention is described.

Figure 14:
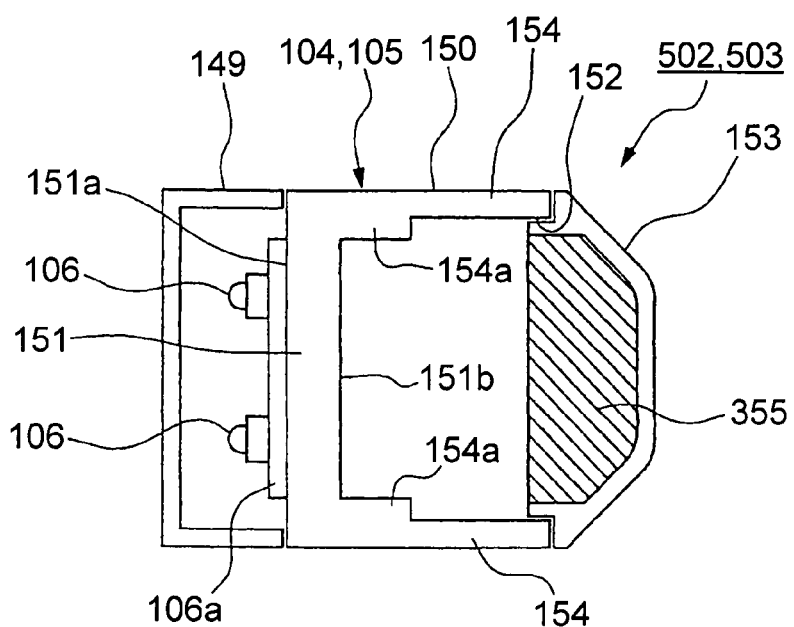
FIG. 14 is a side elevational view of a fifth embodiment of the present invention corresponding to FIG. 2.

The present embodiment uses blinkers 502 and 503 shown in FIG. 14 in place of the blinkers 202 and 203 described hereinabove. In each of the blinkers 502 and 503, a resistance circuit 355 is attached to the inner side of the cover 153 mounted in the rear opening 152 of the lamp body case 150. The resistance circuit 355 is attached in a state wherein it is in close contact with but is insulated from the inner side of the cover 153. Consequently, the light emitting diodes 106 and the resistance circuit 355 are spaced by a greater distance from each other across the internal space of the lamp body case 150 and the bottom wall 151.

According to the fifth embodiment described above, heat generated by the light emitting diodes 106 is radiated by the lamp body case 150 while heat generated by the resistance circuit 355 is radiated by the cover 153. At this time, since the light emitting diodes 106 and the resistance circuit 355 are spaced by a greater distance from each other across the internal space of the lamp body case 150 and the bottom wall 151, transmission of heat between the light emitting diodes106 and the resistance circuit 355 is further suppressed. Since the lamp body case 150 and the cover 153 are utilized effectively as heat radiating members for the light emitting diodes 106 and the resistance circuit 355 in this manner, a temperature rise of the light emitting diodes 106 is suppressed, and the forward voltage is stabilized and the lighting forward current is maintained within an appropriate range. Consequently, the light emitting diodes 106 can save power and have a long life.

Further, miniaturization of the lamp bodies 104 and 105 can be achieved to raise the degree of freedom in design, and also the number of parts and the number of man-hours in assembly can be suppressed to achieve a reduction in the cost.

Subsequently, the sixth embodiment of the present invention is described.

Figure 15:
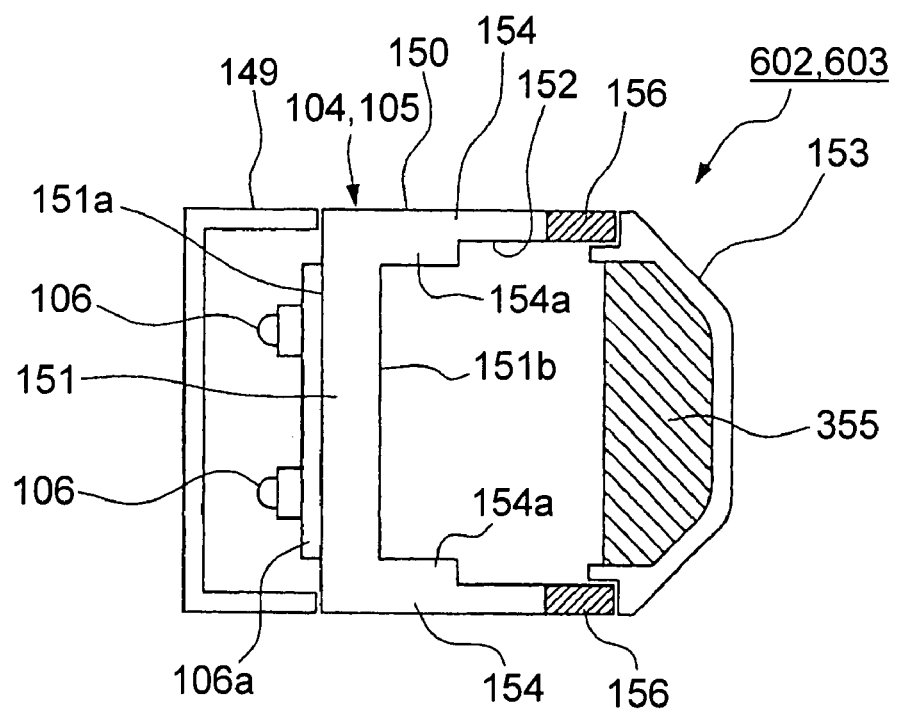
FIG. 15 is a side elevational view of a sixth embodiment of the present invention corresponding to FIG. 2.

The present embodiment uses blinkers 602 and 603 shown in FIG. 15 in place of the blinkers 502 and 503. In each of the blinkers 602 and 603, the resistance circuit 355 is attached to the inner side of the cover 153, and a heat insulating member 156 is interposed between the cover 153 and the lamp body case 150. The heat insulating member 156 of an annular shape connecting to a rear end of the circumferential wall 154 is connected to the rear opening 152 of the lamp body case 150. The cover 153 is mounted through the heat insulating member 156. Further, the resistance circuit 355 is attached to the inner side of the cover 153. The heat insulating member 156 is made of, for example, a baked material (phenol resin) or the like. Transmission of heat between the lamp body case 150 and the cover 153 is interrupted by the heat insulating member 156.

According to the sixth embodiment described above, a similar operation and effect as compared to those of the fifth embodiment described hereinabove are exhibited. Further, since transmission of heat between the lamp body case 150 and the cover 153 is interrupted by the heat insulating member 156, transmission of heat between the light emitting diodes 106 and the resistance circuit 355 can be further suppressed. It is to be noted that, if the heat insulating member 156 is formed not in an annular shape but in a shape of a plate which covers the rear opening 152, the heat insulating property can be further increased.

It is to be noted that the present invention is not limited to the embodiments described above, but, for example, any of a resistance circuit, a regulator and so forth may be used as the adjustment means for the voltage to be applied to the light emitting diodes 106. Further, the configurations of the second to sixth embodiments can be applied not only to the blinkers 102 and 103 but to various lamp apparatus for a vehicle which use a light emitting diode as a light source such as the tail lamp 147 and the license lamp 148. Further, the configurations of the embodiments described above are mere examples and are not limited to a motorcycle but can be modified suitably without departing from the spirit and scope of the present invention.

As described above, according to the present invention, since the voltage to be applied to the light emitting diode is adjusted by the voltage adjustment means provided separately from the lamp body, a temperature rise of the light emitting diode can be prevented to achieve a saving in power and a long life.

Further, since the amount of generated heat is small, parts can be disposed densely in the lamp body, and miniaturization of the blinker can be anticipated and the degree of freedom in design can be increased. Furthermore, since the voltage adjustment means is provided separately, a reduction in weight of the blinker can be anticipated. Accordingly, the blinker apparatus for a vehicle of the present invention is suitable where a reduction in size and weight of a blinker is required particularly with regard to a motorcycle or a door mirror in which a blinker is built.

Further, the voltage adjustment means can be formed integrally with the blinker relay apparatus, and the number of parts and the number of man-hours in assembly can be suppressed to achieve a reduction in the cost.

According to the present invention, since the voltage adjustment means is a resistor, the part can be simplified and a reduction in the cost can be anticipated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lamp apparatus for a vehicle wherein a light emitting diode is used as a light source comprising:
    voltage adjustment means for adjusting a voltage to be applied to said light emitting diode; and
    a lamp body case formed of a heat radiating member, said voltage adjustment means being attached to said heat radiating member and said light emitting diode being attached to said heat radiating member in a spaced relationship from said voltage adjustment means,
    wherein the lamp body case includes a bottom wall and a circumferential wall so as to form a tubular-shaped lamp body case having an opening on a side opposite to the bottom wall, and includes a high heat radiating cover covering the opening, and
    wherein the bottom wall has a greater thickness relative to the circumferential wall of the lamp apparatus such that the light emitting diode is attached to said heat radiating member in the spaced relationship from the voltage adjustment means by a distance corresponding to the thickness of the bottom wall.

2. The lamp apparatus for a vehicle according to claim 1, wherein the voltage adjustment means is positioned on the bottom wall disposed directly adjacent to the light emitting diode.

3. The lamp apparatus for a vehicle according to claim 1, and further including a resistance circuit wherein the resistance circuit is positioned on the circumferential wall of the lamp apparatus.

4. The lamp apparatus for a vehicle according to claim 3, and further including an electric circuit, said electric circuit being spaced apart from the resistance circuit with a partition wall being disposed therebetween.

5. The lamp apparatus for a vehicle according to claim 1, and further including a resistance circuit attached to an inner side of the cover.

* * * * *